United States Patent
Chang et al.

(10) Patent No.: US 12,041,948 B2
(45) Date of Patent: Jul. 23, 2024

(54) ARTIFICIAL FIBER MEAT

(71) Applicant: TAIWAN TEXTILE RESEARCH INSTITUTE, New Taipei (TW)

(72) Inventors: Haw-Jer Chang, New Taipei (TW); Ricky Indra Kusuma, New Taipei (TW)

(73) Assignee: TAIWAN TEXTILE RESEARCH INSTITUTE, New Taipei (TW)

( * ) Notice: Subject to any disclaimer, the term of this patent is extended or adjusted under 35 U.S.C. 154(b) by 160 days.

(21) Appl. No.: 17/680,424

(22) Filed: Feb. 25, 2022

(65) Prior Publication Data

US 2023/0157315 A1    May 25, 2023

(30) Foreign Application Priority Data

Nov. 24, 2021 (TW) ................................. 110143843

(51) Int. Cl.
*A23J 3/22* (2006.01)
*A23J 1/00* (2006.01)
*A23J 1/08* (2006.01)

(52) U.S. Cl.
CPC ............... *A23J 3/227* (2013.01); *A23J 1/006* (2013.01); *A23J 1/08* (2013.01)

(58) Field of Classification Search
CPC ............... A23J 3/227; A23J 1/006; A23J 1/08
See application file for complete search history.

(56) References Cited

U.S. PATENT DOCUMENTS

| | | | |
|---|---|---|---|
| 3,935,319 A * | 1/1976 | Howard ................. | A23J 3/227 426/802 |
| 4,001,441 A * | 1/1977 | Liepa ..................... | A23J 3/22 426/802 |
| 4,125,630 A * | 11/1978 | Orthoefer ............... | A23J 3/22 426/802 |
| 4,265,917 A * | 5/1981 | Fabre ..................... | A23J 3/227 426/453 |
| 9,314,045 B2 | 4/2016 | Nishimura et al. | |
| 2017/0188612 A1 * | 7/2017 | Varadan ................. | A23L 13/43 |
| 2018/0310599 A1 * | 11/2018 | Ajami ..................... | A23L 5/10 |
| 2019/0174808 A1 * | 6/2019 | Nadeau ................... | A23K 50/42 |
| 2020/0329737 A1 * | 10/2020 | Zhu ....................... | A23J 1/006 |

(Continued)

FOREIGN PATENT DOCUMENTS

| CN | 1300397 C | 2/2007 |
|---|---|---|
| CN | 102511646 A | 6/2012 |
| CN | 103442586 A | 12/2013 |

(Continued)

OTHER PUBLICATIONS

Zongqian Wang et al., "Study on the blends of silk fibroin and sodium alginate: Hydrogen bond formation, structure and properties", Polymer vol. 163 (2019) pp. 144-153(https://doi.org/10.1016/j.polymer.2019.01.004), Elsevier, Jan. 2, 2019.

*Primary Examiner* — Anthony J Weier
(74) *Attorney, Agent, or Firm* — McClure, Qualey & Rodack, LLP

(57) ABSTRACT

An artificial fiber meat includes a plurality of fibers, and each of the fibers includes 45 to 95 parts by weight of a vegetable protein and 15 to 35 parts by weight of an alginate, in which a molecular weight distribution range of the vegetable protein is between 15 kDa and 165 kDa.

9 Claims, 1 Drawing Sheet

(56) References Cited

U.S. PATENT DOCUMENTS

2022/0330573 A1* 10/2022 Zotter .................... A23L 5/43
2022/0330575 A1* 10/2022 Boulet-Audet ......... A23J 3/227

FOREIGN PATENT DOCUMENTS

| CN | 112205579 A | | 1/2021 |
|----|----|----|----|
| TW | I686141 B | | 3/2020 |
| TW | I705767 B | | 10/2020 |
| WO | WO2008124629 | * | 10/2008 |
| WO | WO2013055360 | * | 4/2013 |
| WO | WO2021095034 | * | 5/2021 |

* cited by examiner

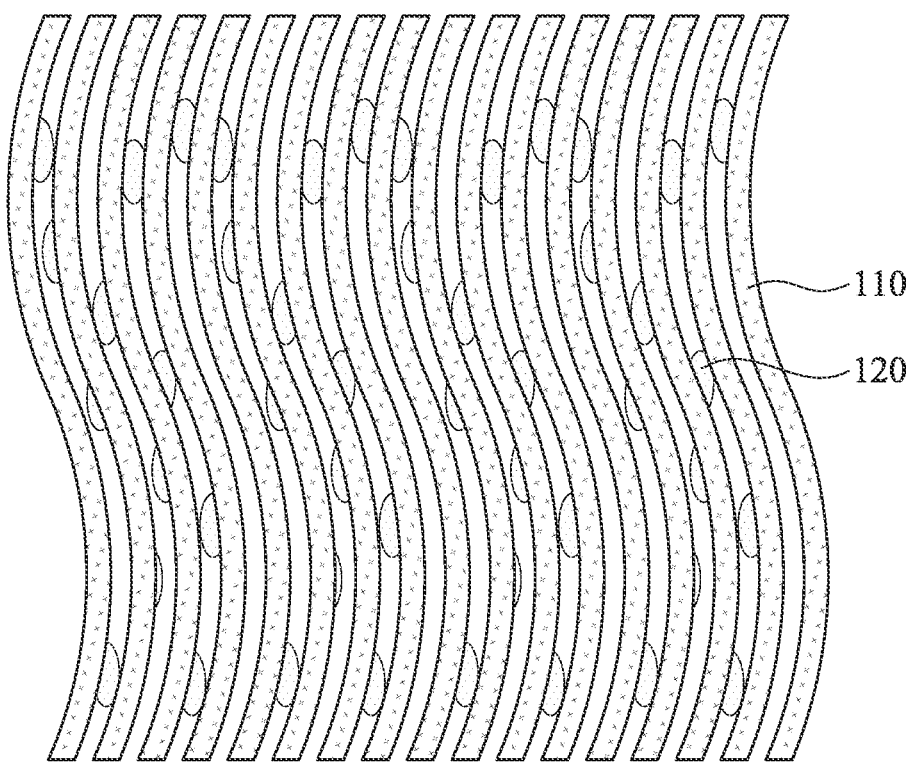

ARTIFICIAL FIBER MEAT

CROSS-REFERENCE TO RELATED APPLICATION

This application claims priority to Taiwan Application Serial Number 110143843, filed Nov. 24, 2021, which is herein incorporated by reference.

BACKGROUND

Field of Invention

The present disclosure relates to an artificial food, and particularly relates to an artificial fiber meat.

Description of Related Art

With the change of diet concept and the improvement of living standards, people not only focus on food and clothing, but also start to pay attention to nutrition and health. Therefore, vegetarian diet gradually replaces meat diet in daily lives. In order to coordinate traditional dietary flavor and vegetarian demands, artificial meat products such as vegetarian meat have begun to appear on the market, which can not only have the taste of meat, but also prevent obesity.

However, the artificial meat products currently on the market cannot be widely accepted by all consumers because the artificial meat products at the current stage are difficult to simulate the edible taste of real meat. In addition, since most of the artificial meat products on the market are manufactured by extrusion, they are usually lumps and unable to provide a tissue texture and a fiber texture similar to real meat, which greatly affects the simulation of artificial meat products to real meat.

SUMMARY

The present disclosure provides an artificial fiber meat, which has a similar edible taste to real meat, thus provides high simulation to real meat, and is suitable for being manufactured by a spinning process.

According to some embodiments of the present disclosure, an artificial fiber meat includes a plurality of fibers, and each of the fibers includes 45 to 95 parts by weight of a vegetable protein and 15 to 35 parts by weight of an alginate, in which a molecular weight distribution range of the vegetable protein is between 15 kDa and 165 kDa.

In some embodiments of the present disclosure, the vegetable protein is a corn protein, a soybean protein, a bean protein, or combinations thereof.

In some embodiments of the present disclosure, each of the fibers further includes 20 to 40 parts by weight of an animal protein.

In some embodiments of the present disclosure, the animal protein is a chicken egg white protein, a duck egg white protein, or combinations thereof.

In some embodiments of the present disclosure, a fiber diameter of each of the fibers is between 20 μm and 100 μm.

In some embodiments of the present disclosure, the vegetable protein has a long-chain molecular structure.

In some embodiments of the present disclosure, the fibers are unidirectionally aligned long fibers.

In some embodiments of the present disclosure, the fibers are wet-spun fibers.

In some embodiments of the present disclosure, the artificial fiber meat further includes an adhesive adhered between the fibers, in which the adhesive is a papain.

In some embodiments of the present disclosure, the artificial fiber meat is subjected to a shear force test, a longitudinal shear force of the fibers is between 3 kg and 20 kg, and a radial shear force of the fibers is between 3 kg and 10 kg.

According to the aforementioned embodiments of the present disclosure, since the artificial fiber meat includes a high content of the vegetable protein with a certain molecular weight distribution range, the artificial fiber meat can have an edible taste similar to the real meat, so as to provide high simulation to real meat. On the other hand, since the artificial fiber meat includes an appropriate amount of the alginate, the artificial fiber meat can be suitably manufactured by a spinning process, so as to be provided with a tissue texture and a fiber texture similar to real meat.

BRIEF DESCRIPTION OF THE DRAWINGS

The disclosure can be more fully understood by reading the following detailed description of the embodiments, with reference made to the accompanying drawings as follows:

FIG. 1 is a schematic structural diagram illustrating an artificial fiber meat according to some embodiments of the present disclosure.

DETAILED DESCRIPTION

Reference will now be made in detail to the present embodiments of the disclosure, examples of which are illustrated in the accompanying drawings. Wherever possible, the same reference numbers are used in the drawings and the description to refer to the same or like parts.

The present disclosure provides an artificial fiber meat, which includes a high content of a vegetable protein, in which the vegetable protein has a certain molecular weight distribution range, such that the artificial fiber meat can have an edible taste similar to real meat, thereby providing high simulation to real meat. In addition, by including an appropriate amount of an alginate in the artificial fiber meat of the present disclosure, the artificial fiber meat can be suitably manufactured by a spinning process, so as to be provided with a tissue texture and a fiber texture similar to real meat.

FIG. 1 is a schematic structural diagram illustrating an artificial fiber meat 100 according to some embodiments of the present disclosure. The artificial fiber meat 100 of the present disclosure includes a plurality of fibers 110, in which each of the fibers 110 includes 45 parts by weight to 95 parts by weight of a vegetable protein and 15 parts by weight to 35 parts by weight of an alginate. When the content (ratio) of the vegetable protein falls within the above range, the artificial fiber meat 100 may have a protein content close to a protein content of real meat, thereby providing high nutritional value. In some preferred embodiments, each of the fibers 110 may include 80 parts by weight to 95 parts by weight of the vegetable protein, so as to further satisfy the artificial meat products with high protein content requirements. In addition, when the content (ratio) of the alginate falls within the above range, a fluidity of the spinning solution (e.g., a spinning solution including at least the vegetable protein and the alginate) can be improved, thereby improving the spinnability of the spinning solution, such that the fibers 110 of the present disclosure are suitable for being manufactured by the spinning process, and a high content of protein is ensured to be provided by the artificial fiber meat 100. In detail, if the content of the alginate is less than 15 parts by weight, it might be difficult for the spinning solution to be drawn into fibers through the spinning process to form the fibers 110 with a complete structure; if the content of the alginate is greater than 35 parts by weight, it might cause the texture of the artificial fiber meat 100 to be brittle, hard, and inelastic, thereby affecting the chewing taste of the artificial fiber meat 100, and might also cause a low proportion of the vegetable protein in the artificial fiber meat 100 (i.e., a low protein content), resulting in insufficient nutritional value. In some embodiments, the alginate can be, for example, a sodium alginate, which is a safe food additive.

A molecular weight distribution range of the vegetable protein of the present disclosure is between 15 kDa and 165 kDa, such that the artificial fiber meat 100 has an edible taste similar to real meat, and thus has high simulation to real meat. In detail, due to the wide range of molecular weight distribution of the vegetable protein disclosed in the present disclosure, it can simulate the structure of real protein in real meat, such that the artificial fiber meat 100 provide a multilevel edible taste similar to real meat, thereby providing high simulation to real meat. In some embodiments, the vegetable protein can be, for example, an isolated protein such as a corn protein, a soy protein, a bean protein, or combinations thereof. In some preferred embodiments, the vegetable protein is the isolated soy protein.

In some embodiments, the vegetable protein may have a long-chain molecular structure, thereby enhancing the spinnability of the vegetable protein, such that the fibers 110 are suitable for being manufactured through a spinning process. For example, before the spinning process, an edible alkali such as sodium hydroxide or sodium bicarbonate (baking soda) can be added to the spinning solution including the vegetable protein as a chain expander, such that the molecular structure of the vegetable protein can be expanded from a spherical structure to a long-chain molecular structure. In addition, by adding the alkaline chain expander, the vegetable protein can have high solubility and high fluidity, which is beneficial to the spinning process. For example, in some embodiments, when based on a total volume of a solvent (e.g., water) and a sodium bicarbonate in the spinning solution, a molarity of the sodium bicarbonate can be between 0.8 M and 1.2 M, and is preferably 1 M. In some embodiments, the spinning process may be, for example, a wet spinning process, an electrospinning process, or a melt spinning process. In some preferred embodiments, the spinning process is a wet spinning process, that is, the fibers 110 may be wet-spun fibers.

Since the fibers 110 of the present disclosure can be manufactured through a spinning process, in some embodiments, a fiber diameter of the fibers 110 can be between 20 μm and 100 μm, such that the artificial fiber meat 100 is provided with a tissue texture and a fiber texture similar to real meat. In detail, if the fiber diameter of the fibers 110 is greater than 100 μm, the artificial fiber meat 100 may be too chewy due to excessive toughness, and may not provide a delicate taste; if the fiber diameter of the fibers 110 is less than 20 μm, the structure of the artificial fiber meat 100 may be too soft, thereby providing poor chewability. In some embodiments, the fibers 110 may be long fibers that are unidirectionally aligned (i.e., long fibers that extend in a same direction), so as to avoid the artificial fiber meat 100 from having an edible taste of reconstituted meat.

In some embodiments, each of the fibers 110 of the artificial fiber meat 100 may further include 20 parts by weight to 40 parts by weight of an animal protein. The animal protein falling within the above content range can moderately increase the protein content in the artificial fiber meat 100, and can provide the artificial fiber meat 100 with a delicate and elastic taste. On the other hand, since the animal protein and the vegetable protein are of high compatibility, and since the animal protein can start to solidify at a relatively low temperature (e.g., 58° C. to 70° C.), the formation of the fibers 110 may be facilitated during the spinning process. In some embodiments, the animal protein may be a poultry egg protein, such as a chicken egg white protein, a duck egg white protein, or combinations thereof, thereby improving the convenience of raw material acquisition.

In some embodiments, the artificial fiber meat 100 may further include 0.2 parts by weight to 7 parts by weight of an adhesive 120. The adhesive 120 can be disposed between the adjacent fibers 110 to provide adhesion between the fibers 110. The adhesive 120 within the above content range can ensure that the artificial fiber meat 100 might not be in an excessively loose condition under the premise of not excessively affecting the texture and taste of the fibers 110, thereby simulating the lump-structure of real meat. In some embodiments, the adhesive 120 may be a natural proteolytic enzyme such as a papain, which moderately decomposes proteins (animal or vegetable proteins) in the fibers 110 to adhere the fibers 110 to each other. In addition, the artificial fiber meat 100 can have a smoother texture by using the natural proteolytic enzymes to moderately destroy the tissue of the fibers 110.

In the following descriptions, features and effects of the present disclosure will be described more specifically with reference to the artificial fiber meat of some embodiments and comparative examples. It is noted that without exceeding the scope of the present disclosure, the materials used, their amount and ratio, processing details, processing flow, etc. can be appropriately alternated. Therefore, the present disclosure should not be interpreted restrictively by the embodiments provided below.

The detailed descriptions (e.g., ingredients and contents) of the artificial fiber meat of each embodiment and comparative example was shown in Table 1, in which each artificial fiber meat was manufactured at least through the following steps. Firstly, a soy protein was uniformly mixed with an aqueous sodium bicarbonate solution with a molarity of 1 M to form a vegetable protein solution. Next, a sodium alginate and a chicken egg white protein (as appropriate) were added to the vegetable protein solution and stirred uniformly to form a spinning solution. Subsequently, the spinning solution was subjected to a wet spinning process at room temperature, and the formed fibers were collected into fiber bundles, in which the coagulation bath used in the wet spinning process includes ethanol and water in a weight ratio of 1:1 with acetic acid (with a molarity of 0.1M) and calcium chloride (with a weight percent concentration of 5 wt. %). Next, the fiber bundles were rinsed several times with clean water (with a pH value of 7), and the fiber bundles were taken off and flattened to dry, thereby obtaining the artificial fiber meat of each embodiment and comparative example.

TABLE 1

| Ingredient (Part by weight) | Embodiment 1 | Embodiment 2 | Embodiment 3 | Embodiment 4 | Embodiment 5 | Comparative example 1 |
|---|---|---|---|---|---|---|
| Soy Protein | 65 | 75 | 85 | 60 | 45 | 100 |
| Egg white | N/A | N/A | N/A | 20 | 40 | N/A |
| Sodium alginate | 35 | 25 | 15 | 20 | 15 | N/A |

<Experimental 1: Fiber Diameter of Fibers in Artificial Fiber Meat>

In this experiment, with the aid of the scanning electron microscope (SEM), the fibers in the artificial fiber meat of each embodiment and comparative example was measured for fiber diameter. The results are shown in Table 2, in which the numerical range shown in Table 2 represents the diameter range constituted by the largest fiber diameter and the smallest fiber diameter in about 100 fibers.

TABLE 2

|  | Embodiment 1 | Embodiment 2 | Embodiment 3 | Embodiment 4 | Embodiment 5 | Comparative example 1 |
|---|---|---|---|---|---|---|
| Fiber diameter range (μm) | 20-30 | 20-30 | 20-30 | 30-50 | 50-60 | 10-100 |

As can be seen from the results of Table 2, the fiber diameter of the fibers in the artificial fiber meat of each embodiment all fell within the range of 20 μm to 60 μm, thereby possessing a tissue texture, a fiber texture, and an edible taste similar to real meat. On the contrary, since the artificial fiber meat of comparative example 1 has an excessively large range of fiber diameter, the artificial fiber meat of comparative example 1 cannot provide an edible taste similar to real meat.

<Experimental 2: Shear Force Test for Artificial Fiber Meat>

In this experiment, the artificial fiber meats of embodiments 2, 3, and 5 were tested for shear force using a measuring device equipped with a Warner-Bratzler Shear (WBS) cutter. The results are shown in Table 3.

TABLE 3

|  | Embodiment 2 | Embodiment 3 | Embodiment 5 | Ideal numerical range |
|---|---|---|---|---|
| Longitudinal shear force (kg) | 18.14 | 10.3 | 7.3 | 3-20 |
| Radial shear force (kg) | 3.57 | 4.3 | 3.49 | 3-10 |

As can be seen from the results of Table 3, the longitudinal and radial shear forces of the fibers in the artificial fiber meat of embodiments 2, 3, and 5 all fell within the ideal numerical range (the ideal numerical range is obtained according to Reference 1<ANIM SCI 2000, 78: 2836-2841.> and Reference 2 <Meat Sci. 2003 August; 64(4): 507-12.>). Therefore, it can be seen that the artificial fiber meat of embodiments 2, 3, and 5 provides appropriate tenderness, that is, moderate softness and toughness, which provide an edible taste that is similar to real meat, thereby having high simulation to real meat.

<Experimental 3: Texture Profile Analysis for Artificial Fiber Meat>

In this experiment, the chewing motion of the human oral cavity was simulated through the texture analyzer probe, and the artificial fiber meats of embodiments 2, 3, and 5 were compressed twice to conduct a texture profile analysis (TPA), such that the hardness, adhesiveness, chewiness, elasticity, cohesion, and recovery of each artificial fiber meat were obtained. The results are shown in Table 4.

TABLE 4

|  | Embodiment 2 | Embodiment 3 | Embodiment 5 | Ideal numerical range |
|---|---|---|---|---|
| hardness (kg) | 0.54 | 0.6 | 0.32 | 0.2-1.1 |
| adhesiveness (kg) | 0.48 | 0.53 | 0.27 | 0.1-0.7 |
| chewiness (kg) | 0.48 | 0.5 | 0.22 | 0.1-0.7 |
| elasticity (mm) | 1.00 | 0.97 | 0.85 | 0.7-1.4 |
| cohesion (w/o unit) | 0.88 | 0.88 | 0.82 | 0.4-1.0 |
| recovery (w/o unit) | 0.49 | 0.53 | 0.49 | 0.3-0.8 |

As can be seen from the results in Table 4, every value of the artificial fiber meats of embodiments 2, 3, and 5 all fell within the ideal numerical range (the ideal numerical range is obtained according to Reference 1<ANIM SCI 2000, 78: 2836-2841.> and Reference 2<Meat Sci. 2003 August; 64(4): 507-12.>), and every value did not overly approach the end value (upper and lower limit) of the ideal numerical range. Therefore, it can be seen that the artificial fiber meats of embodiments 2, 3, and 5 provide an edible taste that is similar to real meat, thereby having high simulation to real meat.

According to the aforementioned embodiments of the present disclosure, since the artificial fiber meat of the present disclosure includes a high content of the vegetable protein with a certain molecular weight distribution range and an appropriate amount of the alginate, the artificial fiber meat not only can provide an edible taste similar to real meat to provide high simulation to real meat, but also can be manufactured by a spinning process, thereby providing a tissue texture and a fiber texture similar to real meat, and having a lower manufacturing cost compared with processes such as melt extrusion and three-dimensional (3D) printing. On the other hand, by making the artificial fiber meat further include the animal protein, the protein content in the artificial fiber meat can be increased, so as to satisfy the artificial meat products with high protein content requirements. In addition, through the adhesive disposed between the fibers, the artificial fiber meat further simulates a lump-structure of real meat.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure covers modifications and variations of this disclosure provided they fall within the scope of the following claims.

What is claimed is:

1. An artificial fiber meat, comprising:
 a plurality of fibers, each of the fibers comprising:
 45 to 95 parts by weight of a vegetable protein, wherein a molecular weight distribution range of the vegetable protein is between 15 kDa and 165 kDa, wherein the vegetable protein has a long-chain molecular structure; and
 15 to 35 parts by weight of an alginate.

2. The artificial fiber meat of claim 1, wherein the vegetable protein is a corn protein, a soybean protein, a bean protein, or combinations thereof.

3. The artificial fiber meat of claim 1, wherein each of the fibers further comprises 20 to 40 parts by weight of an animal protein.

4. The artificial fiber meat of claim 3, wherein the animal protein is a chicken egg white protein, a duck egg white protein, or combinations thereof.

5. The artificial fiber meat of claim 1, wherein a fiber diameter of each of the fibers is between 20 μm and 100 μm.

6. The artificial fiber meat of claim 1, wherein the fibers are unidirectionally aligned long fibers.

7. The artificial fiber meat of claim 1, wherein the fibers are wet-spun fibers.

8. The artificial fiber meat of claim 1, further comprising an adhesive adhered between the fibers, wherein the adhesive is a papain.

9. The artificial fiber meat of claim 1, wherein the artificial fiber meat is subjected to a shear force test, a longitudinal shear force of the fibers is between 3 kg and 20 kg, and a radial shear force of the fibers is between 3 kg and 10 kg.

* * * * *